(12) United States Patent
Sorbello

(10) Patent No.: US 11,049,103 B2
(45) Date of Patent: *Jun. 29, 2021

(54) DESIGNATION OF A TRUSTED USER

(71) Applicant: Capital One Services, LLC, McLean, VA (US)

(72) Inventor: Mark Sorbello, Richmond Hill (CA)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/929,479

(22) Filed: May 5, 2020

(65) Prior Publication Data

US 2021/0090079 A1 Mar. 25, 2021

Related U.S. Application Data

(63) Continuation of application No. 16/576,499, filed on Sep. 19, 2019, now Pat. No. 10,685,351.

(51) Int. Cl.
| | |
|---|---|
| *G06Q 40/00* | (2012.01) |
| *G06Q 20/40* | (2012.01) |
| *G06F 16/9535* | (2019.01) |
| *G06N 3/08* | (2006.01) |
| *G06N 3/04* | (2006.01) |
| *G06Q 20/38* | (2012.01) |
| *H04W 12/63* | (2021.01) |

(52) U.S. Cl.
CPC ......... *G06Q 20/40* (2013.01); *G06F 16/9535* (2019.01); *G06N 3/04* (2013.01); *G06N 3/08* (2013.01); *G06Q 20/383* (2013.01); *H04W 12/63* (2021.01)

(58) Field of Classification Search
None
See application file for complete search history.

(56) References Cited

U.S. PATENT DOCUMENTS

| | | | |
|---|---|---|---|
| 8,918,637 | B2 | 12/2014 | Wentker et al. |
| 2013/0159195 | A1 | 6/2013 | Kirillin et al. |
| 2015/0081551 | A1 | 3/2015 | Yu |
| 2018/0158061 | A1* | 6/2018 | Edelstein ........... G06Q 20/4016 |
| 2019/0073676 | A1* | 3/2019 | Wang .................. G06Q 20/405 |
| 2019/0132306 | A1* | 5/2019 | Avni ...................... G06Q 20/40 |
| 2019/0297091 | A1* | 9/2019 | Kirkham ................. G06F 21/31 |
| 2019/0354660 | A1* | 11/2019 | Fong ....................... G06K 9/46 |

OTHER PUBLICATIONS

Co-pending U.S. Appl. No. 16/576,499, filed Sep. 19, 2019.

* cited by examiner

*Primary Examiner* — Olabode Akintola
(74) *Attorney, Agent, or Firm* — Harrity & Harrity, LLP

(57) ABSTRACT

A device receives a request for a trust designation for a user that is to utilize a merchant application to interact with one or more other users, wherein the merchant application includes one or more interfaces that allow the user to interact with the one or more other users while remaining anonymous or partially anonymous. The device obtains user data for the user based on information included in the request. The device determines the trust designation for the user by using a data model that has been trained using machine learning to process the user data. The device permits at least one of the one or more interfaces of the merchant application to display the trust designation, wherein the user remains anonymous or partially anonymous while the trust designation is displayed.

20 Claims, 9 Drawing Sheets

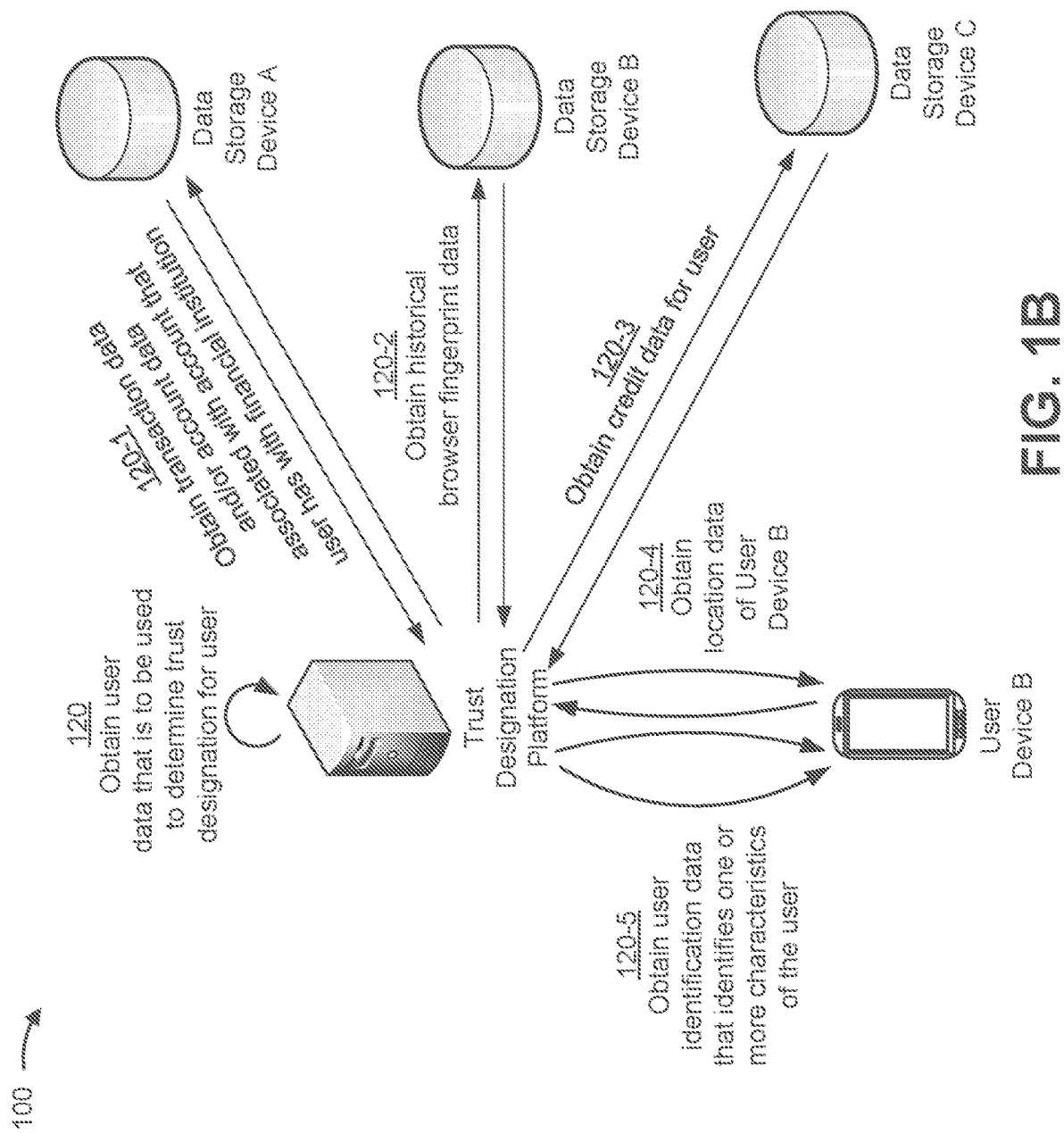

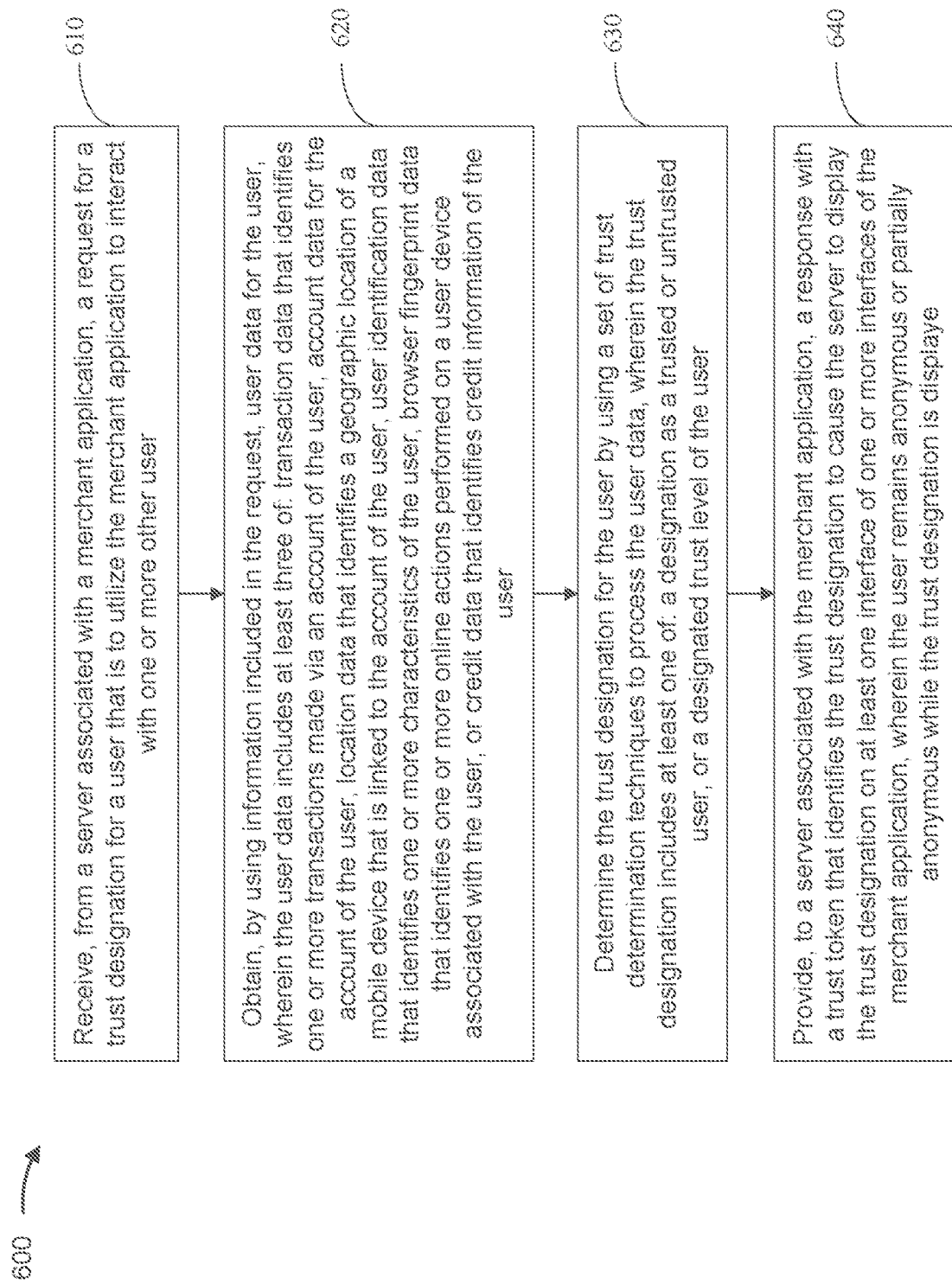

DESIGNATION OF A TRUSTED USER

RELATED APPLICATION

This application is a continuation of U.S. patent application Ser. No. 16/576,499, filed Sep. 19, 2019, which is incorporated herein by reference.

BACKGROUND

A transaction made between two or more devices over a network may be protected using a number of different types of protocols, encryption techniques, and/or the like. For example, the transaction may be protected using a secure socket layer (SSL) protocol and/or another type of protocol.

SUMMARY

According to some implementations, a method may include receiving a request for a trust designation for a user that is to utilize a merchant application to interact with one or more other users. The merchant application may include one or more interfaces that allow the user to interact with the one or more other users while remaining anonymous or partially anonymous. The method may include obtaining, by using information included in the request, user data for the user. The user data may include at least two or more of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user. The method may include determining the trust designation for the user by using a data model that has been trained using machine learning to process the user data, wherein the trust designation includes at least one of: a designation as a trusted or untrusted user, or a designated trust level of the user. The method may include permitting at least one of the one or more interfaces of the merchant application to display the trust designation. The user may remain anonymous or partially anonymous while the trust designation is displayed.

According to some implementations, a device may include one or more memories, and one or more processors, communicatively coupled to the one or more memories, configured to: receive, from a server associated with a merchant application, a request for a trust designation for a user that is to utilize the merchant application to interact with one or more other users. The one or more processors may be configured to obtain, by using information included in the request, user data for the user. The user data may include at least two of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated browser usage of the user, or credit data that identifies credit information of the user. The one or more processors may be configured to determine the trust designation for the user by using a data model that has been trained using machine learning to process the user data. The trust designation may include at least one of: a designation as a trusted or untrusted user, or a designated trust level of the user. The one or more processors may be configured to provide, to the server associated with the merchant application, a response with a trust token that identifies the trust designation to permit the server to display the trust designation on at least one interface of one or more interfaces of the merchant application.

According to some implementations, a non-transitory computer-readable medium may store one or more instructions. The one or more instructions, when executed by one or more processors of a device, may cause the one or more processors to: receive, from a server associated with a merchant application, a request for a trust designation for a user that is to utilize the merchant application to interact with one or more other users. The one or more instructions may cause the one or more processors to obtain, by using information included in the request, user data for the user. The user data may include at least three of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user. The one or more instructions may cause the one or more processors to determine the trust designation for the user by using a set of trust determination techniques to process the user data, wherein the trust designation includes at least one of: a designation as a trusted or untrusted user, or a designated trust level of the user. The one or more instructions may cause the one or more processors to provide, to a server associated with the merchant application, a response with a trust token that identifies the trust designation to cause the server to display the trust designation on at least one interface of one or more interfaces of the merchant application. The user may remain anonymous or partially anonymous while the trust designation is displayed.

BRIEF DESCRIPTION OF THE DRAWINGS

FIGS. 1A-1D are diagrams of one or more example implementations described herein.

FIGS. 4-6 are flowcharts of one or more example processes for determining a trust designation for a user and permitting the trust designation to be displayed via one or more interfaces of a merchant application.

DETAILED DESCRIPTION

Figure 1A:
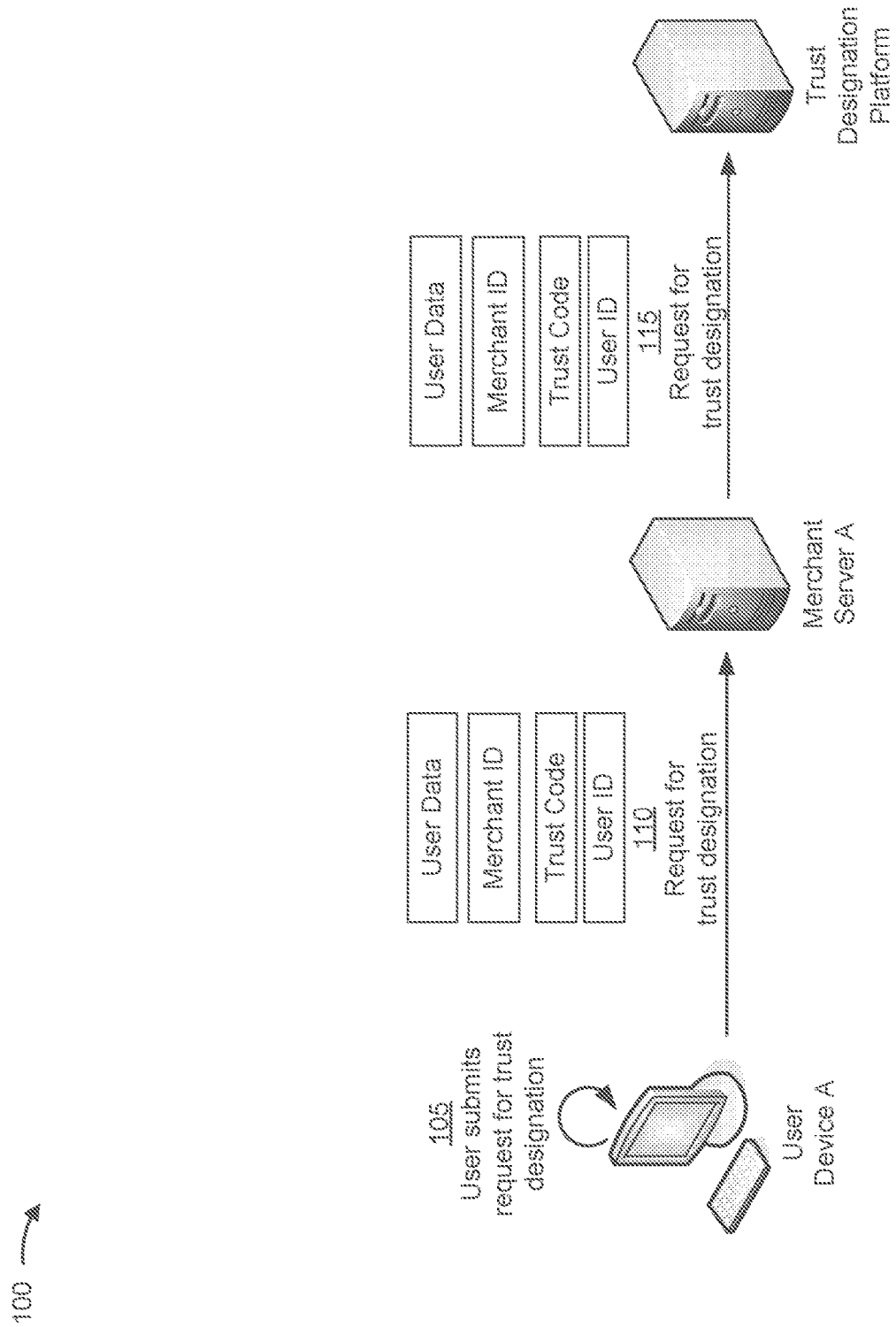

The following detailed description of example implementations refers to the accompanying drawings. The same reference numbers in different drawings may identify the same or similar elements.

A merchant application (e.g., a web application, a mobile application, a desktop application, and/or the like) may, in some situations, allow users to engage in a transaction with each other, such as a transaction for a product and/or a service. For example, a first user may use a first device to post an offer via an interface of the merchant application and a second user may use a second device to access the interface and to accept the offer. In some cases, the merchant application may provide users with a certain degree of anonymity while engaging in transactions. For example, the first user and the second user may have access to each other's profile names and/or profiles while engaging in a transaction but may not have access to each other's personally identifiable information (PII).

However, without a way to verify the credibility of users engaging in transactions, the anonymity provided by the merchant application may cause some users to engage in fraudulent transactions, such as by providing defective and/or fake products and/or services for sale, by accepting payment for products without intent to deliver those products, and/or the like. Furthermore, even if a user could be verified as being a credible user, the merchant application may be unable to verify that an individual who is logged into the merchant application is in fact the credible user. For example, an unauthorized user, such as a fraudster or a family member who does not have permission to use an account of the user, may log into the account and may engage in a fraudulent transaction using the account of the user that had been identified as being a credible user. Without a way to verify the credibility of users, resources (e.g., processing resources, network resources, and/or the like) of devices may be needlessly wasted to carry out fraudulent transactions, resources of customer service devices may be wasted assisting users that have been victimized by a fraudulent transaction, and/or the like.

Some implementations described herein provide a trust designation platform to determine a trust designation for a user and to permit a merchant application to display the trust designation in a manner that is accessible by one or more other users. In some implementations, the trust designation platform may obtain user data that is based on a user having an account with a financial institution. In this case, the trust designation platform may use a data model that has been trained using machine learning to process the user data and to generate a trust token for the user. The trust token may correspond to the trust designation for the user, which may designate the user as a trusted or untrusted user, and/or which may assign the user a designated trust level. Additionally, the trust designation platform may provide a trust token that includes the trust designation to a merchant server to permit the merchant server to provide the trust designation for display via one or more interfaces of the merchant application.

In this way, the trust designation platform permits the trust designation to be displayed via the merchant application in a manner that allows other users to view the trustworthiness of the user, while allowing the user to remain anonymous or partially anonymous. Furthermore, some user data may be used to verify whether the user who is attempting to access the merchant application is in fact an account holder with a financial institution (e.g., an account holder who may have a history of legitimate past transactions, good credit, and/or the like). If the user is unable to be verified, the trust designation may designate the user as being untrusted or as having a low level of trust, which may assist other users in knowing to avoid engaging in transactions with the user, thereby conserving resources of devices that might otherwise assist the user in carrying out a fraudulent transaction.

FIGS. 1A-1D are diagrams of one or more example implementations 100 described herein. Example implementation(s) 100 may include a first user device (shown as User Device A), a first merchant server (shown as Merchant Server A), a trust designation platform, a first data storage device (shown as Data Storage Device A), a second data storage device (shown as Data Storage Device B), a third data storage device (shown as Data Storage Device C), a second user device (shown as User Device B), and a second merchant server (shown as Merchant Server B).

As shown in FIGS. 1A-1D, the trust designation platform may determine a trust designation for a user that is to interact with one or more other users via a merchant application. The merchant application may be supported by the first merchant server (Merchant Server A) and may include a set of interfaces that allow the user to engage in transactions with the one or more other users (e.g., a transaction to sell a product and/or a service, a transaction to purchase a product and/or a service, and/or the like). The merchant application may be a web application, a mobile application, a desktop application, and/or the like.

In some implementations, the merchant application may allow users to interact with each other while remaining anonymous or partially anonymous. For example, the user may have an account with the merchant application (referred to herein as a first account) which may have a profile that is visible to the one or more other users that have access to the merchant application. The user may be able to remain anonymous or partially anonymous because the profile may not reveal any personally identifiable information (PII) to the one or more other users. To provide a specific example, if a buyer engages in a transaction with the user to purchase a product and/or a service, a username of the user and/or the profile of the user may be visible to the buyer, but an actual name of the user, an address of the user, a telephone number of the user, a driver's license of the user, and/or any other PII of the user, may not be visible to the buyer. This allows the user to remain anonymous or partially anonymous when engaging in transactions with other users.

The trust designation, as used herein, may be used to designate the user as a trusted or untrusted user, may be used to designate a particular level of trust to the user, and/or the like. For example, the user may want to receive the trust designation to indicate to the one or more other users that the user is a trustworthy individual (e.g., which may increase chances of the one or more other users wanting to engage in transactions with the user).

One or more implementations described herein involve determining the trust designation for the user, prior to the user engaging in a transaction with the one or more other users. It is to be understood that this is provided by way of example, and that in practice, the trust designation may also be determined at a point a sale, such as during a process for verifying a transaction.

As shown in FIG. 1A, and by reference number 105, the user may interact with the first user device (User Device A) to submit a request for the trust designation. For example, the user may log into the first account that the user has with the merchant application and may interact with a first interface of the merchant application to submit the request for the trust designation. The first interface may be part of the merchant application, may be a pop-up interface supported by a plug-in that is capable of interacting with the merchant application, may be a plug-in that is capable of interacting with a web browser used to display the one or more interfaces of the merchant application to the user, and/or the like.

The request may include a user identifier that identifies the user (and/or the first account of the user), a trust code that indicates that the request is a request for a trust designation, a merchant identifier that identifies a merchant associated with the merchant application, user data that may be used when determining the trust designation, and/or the like. A definition of user data and/or a description of how the first user device may collect and include the user data in the request is provided in connection with FIG. 1B.

As shown by reference number 110, the first user device may provide the request for the trust designation to the first merchant server. For example, the first user device may, based on the user submitting the request, provide the first merchant server with the request (e.g., via a first communication interface, such as a first application programming interface (API) and/or another type of communication interface).

Additionally, or alternatively, the first user device may provide the first merchant server with the request based on one or more other triggers. For example, the profile of the user may have a preferences configuration that specifies to submit a request for a trust designation each time the user publishes a new posting (e.g., an offer to buyer and/or sell a product and/or service) to the merchant application. Consequently, the first user device may provide the first merchant server with the request based on the user publishing the new posting. Additionally, or alternatively, and provided as another example, the merchant application may require users to obtain a trust designation when creating accounts with the merchant application. Consequently, the first user device may provide the first merchant server with the request based on the user creating the first account.

As shown by reference number 115, the first merchant server may provide the request to the trust designation platform. For example, the first merchant server may provide the request to the trust designation platform using a second communication interface, such as a second API and/or another type of communication interface. In some implementations, the first user device may be configured with a plug-in that allows the request to be provided directly to the trust designation platform (e.g., without using the first merchant server as an intermediary).

In this way, the trust designation platform receives the request for the trust designation for the user.

As shown in FIG. 1B, and by reference number 120, the trust designation platform may obtain user data that is to be used to determine the trust designation for the user. For example, the user may have an account with a financial institution (referred to herein as a second account) and the user data associated with the financial institution may be used to determine the trust designation for the user (e.g., the user data might specify that the user has a high rating score, a history of legitimate transactions, and/or the like, which may be indicative of the user being a trustworthy user). To obtain the user data, the trust designation platform may use one or more other communication interfaces (e.g., one or more other APIs or other types of communication interfaces) to obtain the user data from a group of data storage devices, such as the first data storage device (shown as Data Storage Device A), the second data storage device (shown as Data Storage Device B), the third data storage device (shown as Data Storage Device C), and/or the like.

To the extent user data is collected, stored, processed, and/or transmitted, use of such information shall be in accordance with all applicable laws concerning protection of personal information. For example, use of such information may be obtained with consent of the user (e.g., via an opt-in procedure). Furthermore, the user data may be securely transmitted over a network by using various encryption and/or anonymization techniques.

In some implementations, and as shown by reference number 120-1, the trust designation platform may obtain, from the first data storage device, transaction data and/or account data associated with the second account. The transaction data may include data that identifies one or more transactions that have been made via the second account over a time period. The transaction data may include, for example, data that identifies items and/or services that have been purchased, the dates on which the items and/or service were purchased, whether purchased items were returned, and/or the like. The account data may include user account data (e.g., a telephone number, a physical address, an electric mailing (e-mail) address, and/or the like), account modification data that identifies one or more recent changes that have been made to the second account, such as a change to the user account data, and/or the like.

Additionally, or alternatively, and as shown by reference number 120-2, the trust designation platform may obtain, from the second data storage device, historical browser fingerprint data that identifies historical interactions that the user made with a web browser (e.g., a web browser used to access the merchant application). The historical browser fingerprint data may include search history data that identifies one or more websites that the user has visited (e.g., the merchant application, a website associated with the second account with the financial institution, and/or the like), device data of one or more devices that the user used when accessing the one or more websites, such as data that identifies an internet protocol (IP) address, a screen resolution, an operating system, a time zone, a device location, and/or the like.

Additionally, or alternatively, and as shown by reference number 120-3, the trust designation platform may obtain, from the third data storage device, credit data for the user. For example, the trust designation platform may obtain credit data that identifies credit information of the user. The credit information may include a credit rating, a credit report, information identifying an amount of available credit, loan information associated with one or more loans of the user, and/or the like.

Additionally, or alternatively, and as shown by reference number 120-4, the trust designation platform may obtain, from the second user device (shown as User Device B), location data that identifies a geographic location of the second user device. For example, the second user device may be a mobile device that is linked to the second account of the user. The trust designation platform may use information included in the account data (obtained from the first data storage device) to identify the second user device, which may allow the trust designation platform to interact with the second user device to obtain the location data.

Additionally, or alternatively, and as shown by reference number 120-5, the trust designation platform may obtain, from the second user device (and/or from the first user device), user identification data that identifies one or more characteristics of the user. The user identification data may include user image data that depicts the user (e.g., an image of a face of the user, a portion of the face of the user, a portion of another part of the user, and/or the like), user audio data that identifies a voice of the user, a fingerprint of the user, and/or other types of biometric information associated with the user. Additionally, or alternatively, the user identification data may include user text data that identifies a token that may be used to verify the user, a unique username and password combination, and/or the like.

In some implementations, the request provided to the trust designation platform may have included additional user data. For example, the user may have consented to allowing particular types of user data to be collected and provided as part of the request for the trust designation. In this case, when the user interacted with the first user device to submit the request, the first user device may have collected particular user data (e.g., browser fingerprint data, location data, device data, and/or the like) and may have included the particular user data in the request.

In some implementations, the trust designation platform may obtain a subset of the user data described above. For example, the trust designation platform may obtain the transaction data and/or the account data and may determine the trust designation for the user based on the transaction data and/or the account data (e.g., in a manner described further herein). In this case, the trust designation platform may obtain additional user data only if the trust designation platform determines a trust designation that corresponds to a threshold trust level. In this way, the trust designation platform conserves resources (e.g., processing resources, network resources, and/or the like) relative to obtaining all of the user data for the user.

In this way, the trust designation platform obtains the user data that is to be used to determine the trust designation for the user.

Figure 1C:
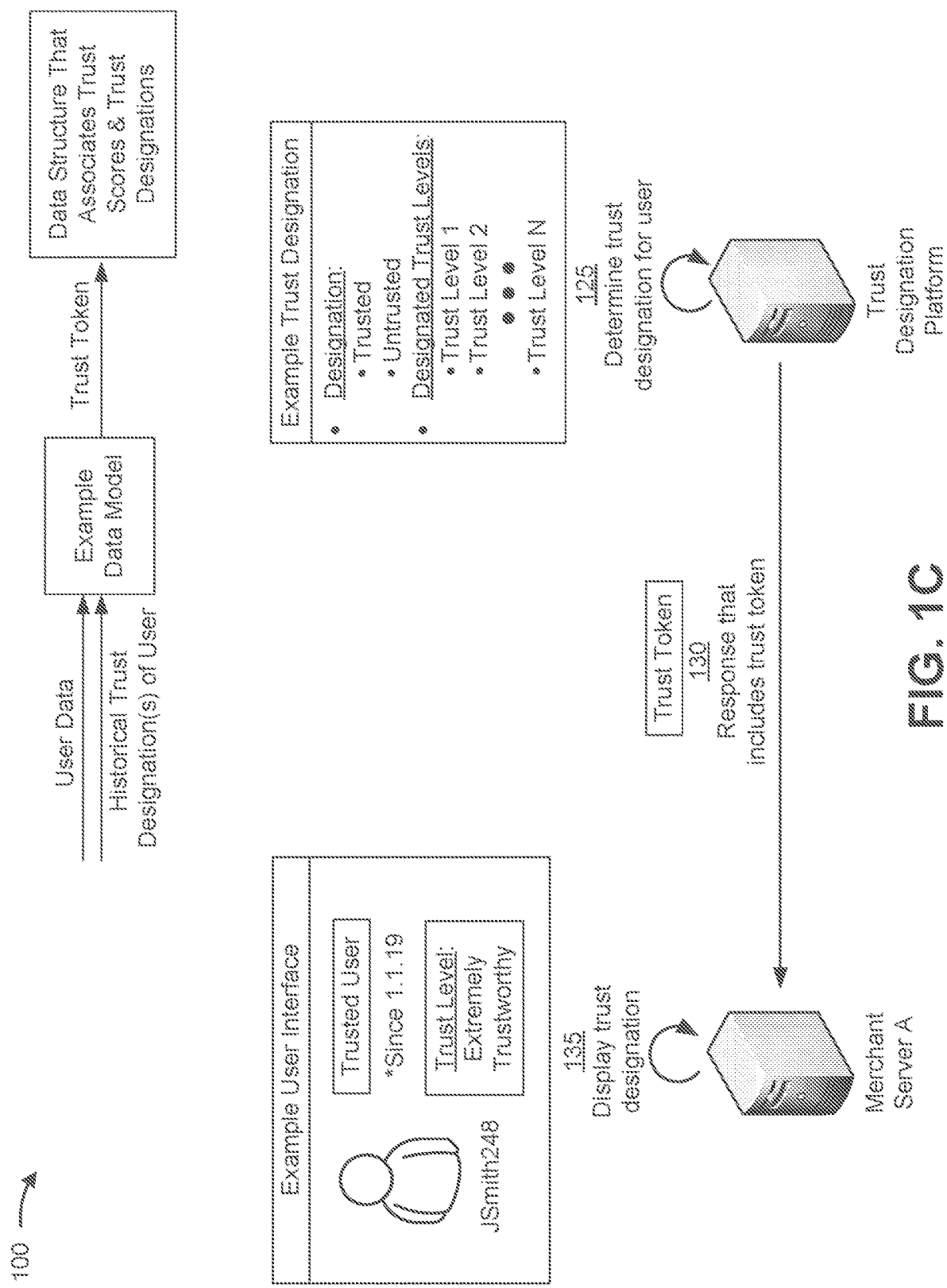

As shown in FIG. 1C, and by reference number 125, the trust designation platform may determine the trust designation for the user. For example, the trust designation platform may determine the trust designation by processing the user data using a data model that has been trained using machine learning, by processing the user data using a set of trust determination techniques, and/or the like, as each described below.

In some implementations, the trust designation platform may determine the trust designation using the data model. For example, the trust designation platform may have trained the data model to be able to generate trust tokens for users and may have access to a data structure that maps those trust tokens to particular trust designations. The data model may have been trained by the trust designation platform or may have been trained by another device (e.g. and made accessible to the trust designation platform).

To train the data model, the trust designation platform may first obtain historical user data for a group of users that have accounts with both the merchant application and with various financial institutions, may process the historical user data to identify a set of features that may be used to train the data model, and may use the set of features to train the data model. Additional information regarding each of these steps is provided below. Furthermore, a measurement of how trustworthy a user is deemed is likely to change over time (e.g., a credit rating of the user will change over time, the user may engage in transactions that increase or decrease their trustworthiness, and/or the like). Consequently, the trust designation platform may use the trained data model to generate initial trust tokens for each user that has accounts with both the merchant application and a particular financial institution but may also use the data model to periodically generate new trust tokens for each respective user (e.g., to ensure that trust designations for users reflect an up to date assessment on their trustworthiness).

As indicated above, to train the data model, the trust designation platform may first obtain historical user data for a group of users that have accounts with both the merchant application and with various financial institutions. The historical user data may include historical transaction data, historical account data, historical browser fingerprint data, historical credit data, historical user identification data, historical location data, and/or the like.

Additionally, the trust designation platform may process the historical user data to identify a set of features that may be used to train the data model. A feature may be a value (e.g., a numerical value, a character value, and/or the like) or a group of values (e.g., a term that comprises multiple character values, a combination of terms, a combination of a numerical value, a character value, and/or a term, and/or the like) that impact a likelihood of a particular user being a trusted or untrusted user. An explanation of how to identify the set of features, as well as specific example features that may be used to train the data model, are provided below.

In some implementations, the trust designation platform may use a set of feature identification techniques to identify the set of features. The set of feature identification techniques may include one or more image recognition and/or computer vision techniques, a similarity analysis technique (e.g., to compare two types of data to each other), a technique that involves text mining and latent semantic analysis (LSA), a trend variable analysis technique, an interest diversity analysis technique, a technique using a neural network, a composite indicators analysis technique, a clustering technique, a regression technique, and/or the like.

As an example, the trust designation platform may use one or more feature identification techniques to identify a first subset of features. In this example, the trust designation platform may use the similarity analysis technique and/or another type of technique to process historical transaction data to identify, as the first subset of features, particular historical transaction data values that increase or decrease a likelihood of a user being trustworthy. For example, if historical transaction data values for one or more recent transactions indicate that transactions occurred in locations that are far away from a location where the user typically engages in transactions (e.g., a series of transactions involving out of state purchases), historical transaction data values indicating that two transactions occurred in two different geographic locations within a threshold time period of each other, and/or the like, then the trust designation platform may identify these historical transaction data values as features that may be used to train the data model (e.g., the example values given above may be used as features that decrease a likelihood of the user being trustworthy, because they increase a likelihood of the account of the user being accessed fraudulently).

Additionally, or alternatively, and provided as another example, the trust designation platform may use one or more feature identification techniques to identify a second subset of features. In this example, the trust designation platform may use the similarity analysis technique and/or another type of technique to process historical account data to identify, as the second subset of features, historical account data values that increase or decrease a likelihood of a user being trustworthy. For example, if historical account data includes one or more values indicating that a recent change was made to an account (e.g., an address change, a telephone number change, and/or the like), then the trust designation platform may identify the one or more historical account data values as features that may be used to train the data model. As a specific example, a value indicating that an address was recently changed may increase a likelihood of unauthorized account use, because an unauthorized user may be modifying account information to gain access to transaction cards of an authorized user. This unauthorized account use may decrease a likelihood of the user being trustworthy.

Additionally, or alternatively, and provided as another example, the trust designation platform may use one or more feature identification techniques to identify a third subset of features. In this example, the trust designation platform may use the trend variable analysis technique, the composite indicators analysis technique, the regression technique, and/or the like, to process historical browser fingerprint data to identify, as the third subset of features, historical browser fingerprint data values that increase or decrease a likelihood of a user being trustworthy. For example, if historical browser fingerprint data values identify reoccurring websites visited by a user, reoccurring device data associated with browser usage of the user (e.g., browser usage at similar time periods each time, browser usage with the same screen brightness, and/or the like), then the trust designation platform may identify these values as features that may be used to train the data model. As a specific example, the data model may be trained to receive real-time user data and to determine whether the real-time user satisfies a threshold level of similarity with the historical browser fingerprint data values described herein.

Additionally, or alternatively, and provided as another example, the trust designation platform may use one or more feature identification techniques to identify a fourth subset of features. In this example, the trust designation platform may use the similar analysis technique and/or another type of technique to process historical credit data to identify, as the fourth subset of features, historical credit data values that increase or decrease a likelihood of a user being trustworthy (e.g., credit data that is indicative of a strong credit rating may increase a likelihood of the user being trustworthy, credit data that is indicative of a poor credit rating may decrease a likelihood of the user being trustworthy, and/or the like).

Additionally, or alternatively, and provided as another example, the trust designation platform may use one or more feature identification techniques to identify a fifth subset of features. In this example, historical user image data may depict one or more users (e.g., that had to submit photo identification when creating an account with a financial institution, to be eligible to receive the trust designation, and/or the like). In this case, the trust designation platform may use one or more image recognition techniques to process the historical user image data to identify, as part of the fifth subset of features, one or more features that identify particular characteristics of the one or more users, such as facial characteristics of users and/or other identifiable characteristics of the user. By identifying characteristics of the users, the trust designation platform may be able to train the data model to be able to receive new image data and to perform a similarity analysis to determine whether a user depicted by the new image data is an authorized user that has an account with a particular financial institution, as described further herein.

Additionally, or alternatively, and provided as another example, the trust designation platform may use historical location data as the sixth subset of features. For example, the historical location data values may identify a residence or place of business of a user. Additionally, the historical location data values may be used as features of the data model because the historical location data values may be compared with location data of devices that are requesting trust designations (e.g., a request for a trust designation coming from a device within a user's residence or place of business increases a likelihood that the individual requesting the trust designation is the account holder with the financial institution, and thus is more likely to be trustworthy.

Additionally, or alternatively, and provided as another example, the trust designation platform may use, as a seventh subset of features, historical time data that identifies an amount of time that users have been buyers and/or sellers via the merchant application (and/or via other similar applications). The historical time data may be used as features of the data model because the longer a user serves as a buyer and/or a seller (e.g., and maintains a good reputation), the more likely the user is to be trustworthy.

Additionally, the trust designation platform may train the data model using the set of features. For example, the trust designation platform may train the data model in a manner that allows the data model to receive new user data as input and to determine a trust token for a given individual based on the new user data. As a specific example, the trust designation platform may train a neural network that has an input layer, one or more intermediate layers (e.g., a fully connected layer, a convolutional layer, a pooling layer, a recurrent layer, and/or the like), and an output layer. In this example, the set of features may be hyperparameters that are used as part of a cost function of the neural network. In this case, the trust designation platform may perform a feedforward technique to provide particular user data values (e.g., that are part of a test dataset) as input to the neural network, and the neural network may output one or more trust tokens that correspond to particular trust designations.

Additionally, the trust designation platform may compare the one or more trust tokens to known values (e.g., configured trust tokens) and may determine an error value based on the comparison between the one or more trust tokens and the known values. The error value may be used to update the cost function (e.g., which may assign weights to particular features of the set of features), and the trust designation platform may perform a backpropagation technique to iteratively train the neural network until a threshold level of accuracy has been reached.

To use the trained data model, the trust designation platform may provide the user data as input to cause the data model to output a trust token for the user. In some implementations, if the user already has been previously assigned trust designations, one or more historical trust tokens that correspond to the previously assigned trust designations may be provided as input to the data model (e.g., in addition to the user data). Additionally, the trust designation platform may use the trust token to determine the trust designation for the user. For example, the trust designation platform may have access to a data structure that maps trust tokens with particular trust designations and may reference the data structure to identify a trust designation that corresponds to the trust token that was output by the data model.

In some implementations, the trust designation platform may determine the trust designation using the set of trust determination techniques. For example, the trust designation platform may be configured with the set of trust determination techniques, which may include one or more techniques that define rules that map ranges of user data values to particular trust tokens and/or trust designations, one or more techniques that may be used to compare historical user data values with corresponding new user data values, and/or the like.

As a specific example, the trust designation platform may be configured with a trust determination technique that maps particular ranges of credit ratings with particular trust tokens. Consequently, the trust designation platform may use the trust determination technique to process the user credit data to determine an appropriate trust token and/or trust designation for the user. Similar trust determination techniques may be configured for one or more other types of user data. In this way, the trust designation platform may use the set of trust determination techniques to determine the trust token and/or the trust designation for the user.

In some implementations, the trust designation platform may store the trust token that identifies the trust designation of the user. For example, the trust designation may use a data structure to associate the trust token with an identifier of the user, such that the trust token may be subsequently referenced and considered when determining, at a later time period, whether a new trust designation is to be assigned to the user.

As shown by reference number 130, the trust designation platform may provide, to the first merchant server, a response that includes the trust token that identifies the trust designation of the user. For example, the trust designation platform may provide the first merchant server with the trust token using the second communication interface.

As shown by reference number 135, the first merchant server may provide the trust designation for display via one or more interfaces of the merchant application. To provide a few examples, the trust designation may be displayed as part of the profile of the user, may be displayed as part of a posting that the user has made to buy or sell a product and/or a service, and/or the like. In some implementations, the trust designation may be displayed in a color that corresponds to a particular trust level that has been designated to the user. In some implementations, additional data may be displayed in connection with the trust designation, such as user data that corresponds to particular features described above (e.g., a time period during which a user has been a buyer or a seller may be displayed for other users via an interface of the merchant application).

In some implementations, the trust designation platform may perform an action based on the trust designation. For example, if the trust designation indicates a particular level of trustworthiness of the user, the first merchant server may only display the trust designation if the particular level of trustworthiness satisfies a threshold level of trust worthiness, may display a trust designation with a particular color based on whether the particular level of trustworthiness satisfies the threshold level of trust worthiness, and/or the like.

In some implementations, the trust designation platform may verify the user by processing a transaction and may determine the trust designation based on a result of the transaction. For example, the trust designation platform may process a transaction (e.g., a one dollar transaction made for verification purposes) and may, while processing the transaction, verify the address of the user, transaction card information for the user, a credit rating of the user, an authentication code sent to the second user device (e.g., the mobile device of the user), and/or the like. If the user is successfully verified via the transaction, the trust designation platform may consider the successful verification when determining the trust designation.

In this way, the trust designation may be displayed in a manner that allows other users to consider the trustworthiness of the user when engaging in transactions with the user, while allowing the user to remain anonymous or partially anonymous during the transactions.

Figure 1D:
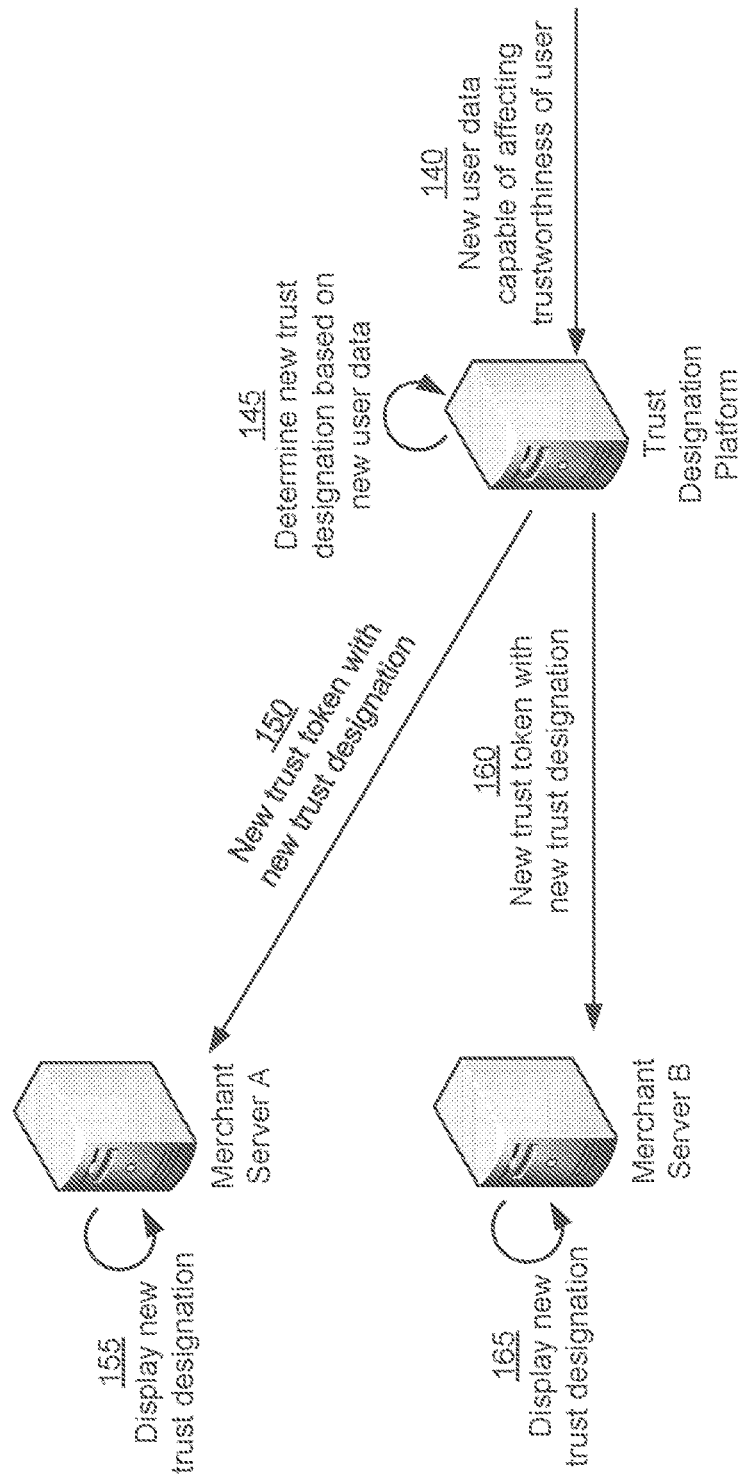

As shown in FIG. 1D, and by reference number 140, the trust designation platform may obtain new user data that is capable of affecting the trustworthiness of the user. For example, over time, the trust designation platform may obtain new transaction data and/or new account data from the first data storage device, may obtain new browser fingerprint data from the first user device, may obtain new credit data for the user from the third data storage device, may obtain new user identification data and/or new location data from the second user device, and/or the like. To provide a specific example, a credit rating of the user may change over time as the user engaging in new transactions that affect the credit rating. Consequently, the trust designation platform may be configured to periodically obtain new credit that may be used to determine new trust designations for the user.

As shown by reference number 145, the trust designation platform may determine the new trust designation based on the new user data. For example, the trust designation platform may determine the new trust designation in a manner described above. In some implementations, the trust designation platform may determine the new trust designation based on another trigger. For example, the trust designation platform may determine the new trust designation based on receiving another request from the user, based on a new posting made by the user (e.g., to buy or sell a product and/or a service), based on a time-related configuration (e.g., a configuration to determine a new trust designation after a threshold amount of time passes, at particular time periods, and/or the like), and/or the like.

As shown by reference number 150, the trust designation platform may provide the first merchant server with a new trust token that includes the new trust designation. As shown by reference number 155, the first merchant server may provide the new trust designation for display via at least one of the one or more interfaces of the merchant application.

As shown by reference number 160, the trust designation platform may provide the new trust token with the new trust designation to one or more other merchant servers, such as the second merchant server. For example, the user may have accounts with multiple merchant applications. In this case, as the trust designation of the user changes, the trust designation platform may notify all (or some) merchant servers of which the user has accounts. As shown by reference number 165, the second merchant server may provide the new trust designation for display via one or more interfaces of another merchant application that is hosted and/or supported by the second merchant server.

As an example, the user may publish a posting at a first time period and may have a first trust designation. At a second time period (e.g., a time after the first time period), and after the new trust designation is determined, the posting may be updated to display the new trust designation, to display both trust designations (e.g., to illustrate that the trust designation of the user has changed), and/or the like.

In this way, the trust designation platform permits the trust designation to be displayed via the merchant application in a manner that allows other users to view the trustworthiness of the user, while allowing the user to remain anonymous or partially anonymous.

As indicated above, FIGS. 1A-1D are provided as one or more examples. Other examples may differ from what is described with regard to FIGS. 1A-1D.

Figure 2:
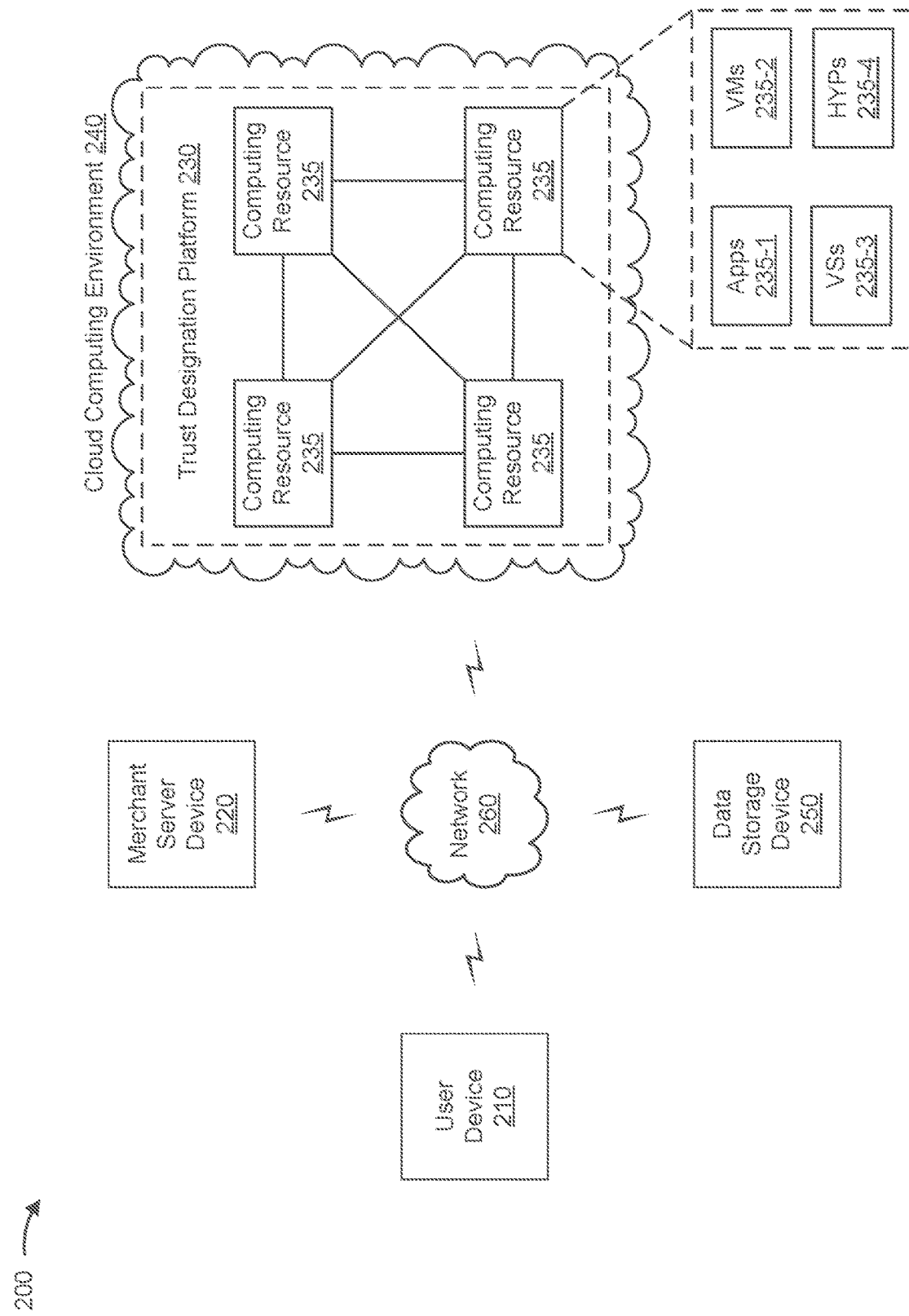
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include a user device 210, a merchant server device 220, a trust designation platform 230 hosted within a cloud computing environment 240, a data storage device 250, and/or a network 260. Devices of environment 200 may interconnect via wired connections, wireless connections, or a combination of wired and wireless connections.

User device 210 includes one or more devices capable of receiving, storing, processing, and/or providing information associated with a trust designation. For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device, and/or a similar device.

In some implementations, user device 210 may have access to a merchant application that allows users to interact with each other to engage in transactions for products and/or services. In some implementations, user device 210 may provide, to merchant server device 220, a request for a trust designation. In some implementations, user device 210 may receive, from trust designation platform 230, a request for user data (e.g., user identification data, user location data, and/or the like). This may cause user device 210 to provide trust designation platform 230 with the user data. In some implementations, user device 210 may display the trust designation via an interface of the merchant application (e.g., which may be hosted by merchant server device 220).

Merchant server device 220 includes one or more devices capable of receiving, storing, processing, and/or providing information associated with a trust designation. For example, merchant server device 220 may include a server device or a group of server devices. In some implementations, merchant server device 220 may host and/or support the merchant application. The merchant application may be a web application, a mobile application, a desktop application, and/or the like. In some implementations, merchant server device 220 may provide the request for the trust designation to trust designation platform 230. In some implementations, merchant server device 220 may receive a response that includes a trust token that identifies the trust designation from trust designation platform 230. This may allow merchant server device 220 to provide the trust designation for display via one or more interfaces of the merchant application. In some implementations, one or more merchant server devices 220 may receive trust tokens that identify new trust designations from trust designation platform 230.

Trust designation platform 230 includes one or more devices capable of receiving, storing, generating, determining, and/or providing information associated with a trust designation. For example, trust designation platform 230 may include a server device (e.g., a host server, a web server, an application server, etc.), a data center device, or a similar device. In some implementations, trust designation platform 230 may use a set of communication interfaces (e.g., application programming interfaces (APIs) and/or the like) to communicate with user device 210, merchant server device 220, data storage device 250, and/or the like, in a manner described elsewhere herein.

In some implementations, as shown, trust designation platform 230 may be hosted in cloud computing environment 240. Notably, while implementations described herein describe trust designation platform 230 as being hosted in cloud computing environment 240, in some implementations, trust designation platform 230 might not be cloud-based (i.e., may be implemented outside of a cloud computing environment) or may be partially cloud-based.

Cloud computing environment 240 includes an environment that hosts trust designation platform 230. Cloud computing environment 240 may provide computation, software, data access, storage, etc. services that do not require end-user knowledge of a physical location and configuration of system(s) and/or device(s) that hosts trust designation platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host trust designation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210, merchant server device 220, and/or data storage device 250. Application 235-1 may eliminate a need to install and execute the software applications on these devices. For example, application 235-1 may include software associated with trust designation platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210, merchant server device 220, and/or data storage device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Data storage device 250 includes one or more devices capable of receiving, storing, processing, and/or providing information associated with a trust designation. For example, data storage device 250 includes a server device or a group of server devices. In some implementations, a first data storage device 250 may store transaction data and/or account data for a group of users. In some implementations, a second data storage device 250 may store historical browser fingerprint data for a group of users. In some implementations, a third data storage device 250 may store credit data for a group of users. In some implementations, one or more data storage devices 250 (e.g., the first, second, and/or third data storage device 250) may provide user data to trust designation platform 230.

Network 260 includes one or more wired and/or wireless networks. For example, network 260 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
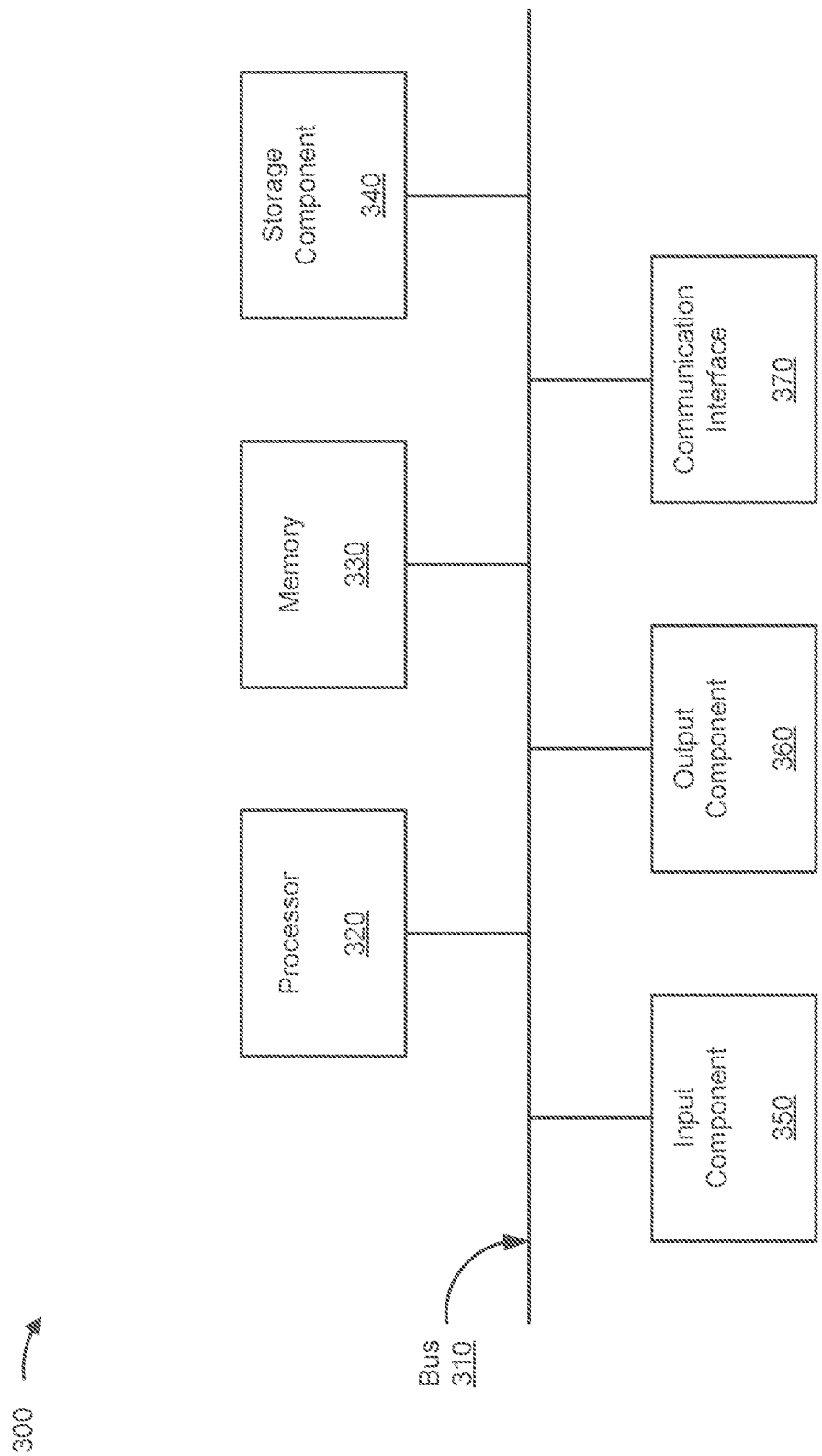
FIG. 3 is a diagram of example components of one or more devices of FIG. 2.

FIG. 3 is a diagram of example components of a device 300. Device 300 may correspond to user device 210, merchant server device 220, trust designation platform 230, and/or data storage device 250. In some implementations, user device 210, merchant server device 220, trust designation platform 230, and/or data storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
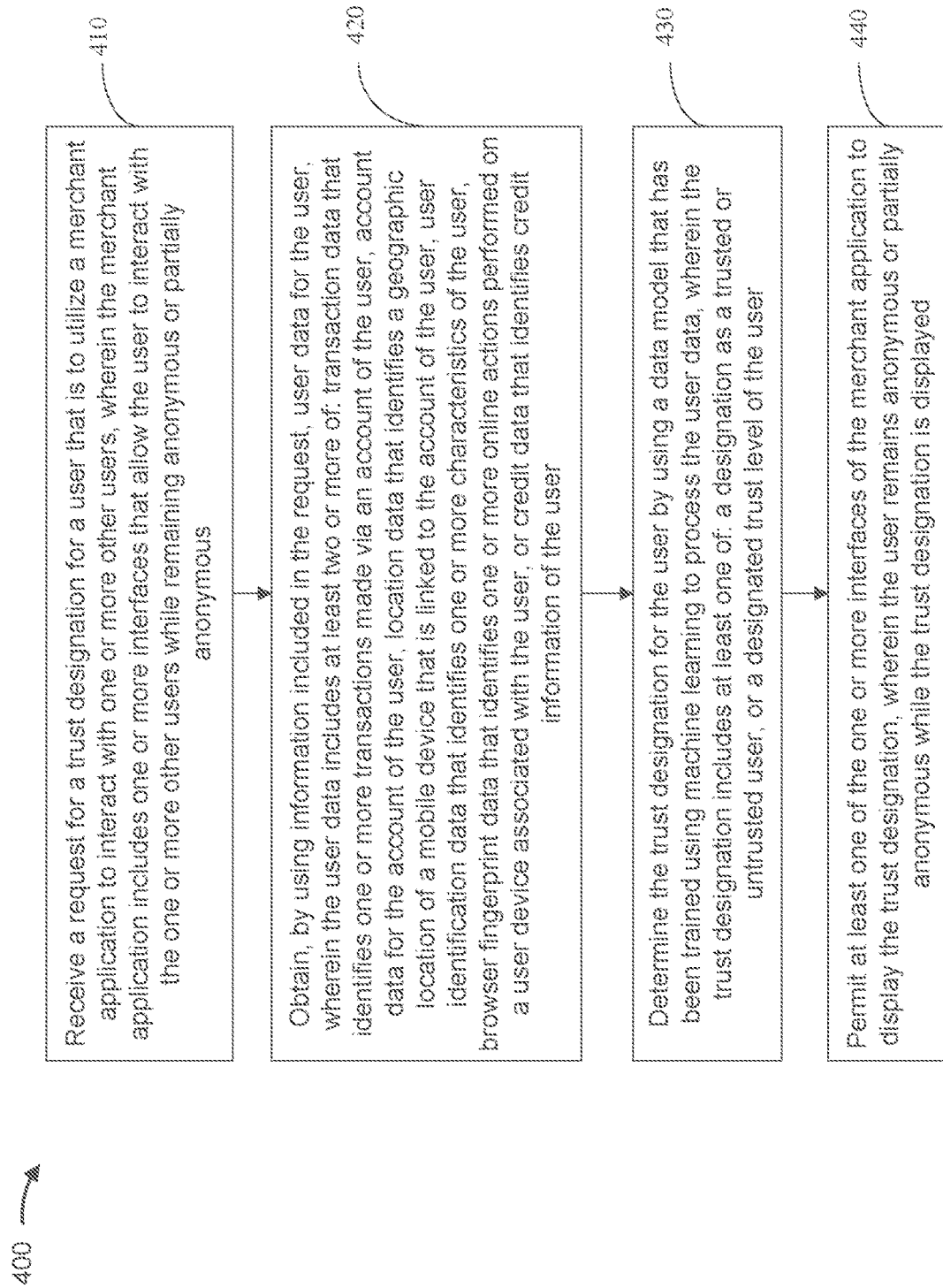

FIG. 4 is a flow chart of an example process 400 for determining a trust designation for a user and permitting the trust designation to be displayed via one or more interfaces of a merchant application. In some implementations, one or more process blocks of FIG. 4 may be performed by a trust designation platform (e.g., trust designation platform 230). In some implementations, one or more process blocks of FIG. 4 may be performed by another device or a group of devices separate from or including the trust designation platform, such as a user device (e.g., user device 210), a merchant server device (e.g., merchant server device 220), a data storage device (e.g., data storage device 250), and/or the like.

As shown in FIG. 4, process 400 may include receiving a request for a trust designation for a user that is to utilize a merchant application to interact with one or more other users, wherein the merchant application includes one or more interfaces that allow the user to interact with the one or more other users while remaining anonymous or partially anonymous (block 410). For example, the trust designation platform (e.g., using computing resource 235, processor 320, memory 330, storage component 340, input component 350, communication interface 370, and/or the like) may receive a request for a trust designation for a user that is to utilize a merchant application to interact with one or more other users, as described above. In some implementations, the merchant application may include one or more interfaces that allow the user to interact with the one or more other users while remaining anonymous or partially anonymous.

As further shown in FIG. 4, process 400 may include obtaining, by using information included in the request, user data for the user, wherein the user data includes at least two or more of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user (block 420). For example, the trust designation platform (e.g., using computing resource 235, processor 320, memory 330, storage component 340, input component 350, output component 360, communication interface 370, and/or the like) may obtain, by using information included in the request, user data for the user, as described above. In some implementations, the user data may include at least two or more of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user.

As further shown in FIG. 4, process 400 may include determining the trust designation for the user by using a data model that has been trained using machine learning to process the user data, wherein the trust designation includes at least one of: a designation as a trusted or untrusted user, or a designated trust level of the user; and (block 430). For example, the trust designation platform (e.g., using computing resource 235, processor 320, memory 330, storage component 340, and/or the like) may determine the trust designation for the user by using a data model that has been trained using machine learning to process the user data, as described above. In some implementations, the trust designation may include at least one of: a designation as a trusted or untrusted user, or a designated trust level of the user.

As further shown in FIG. 4, process 400 may include permitting at least one of the one or more interfaces of the merchant application to display the trust designation, wherein the user remains anonymous or partially anonymous while the trust designation is displayed (block 440). For example, the trust designation platform (e.g., using computing resource 235, processor 320, memory 330, storage component 340, output component 360, communication interface 370, and/or the like) may permit at least one of: the one or more interfaces of the merchant application to display the trust designation, as described above. In some implementations, the user may remain anonymous or partially anonymous while the trust designation is displayed.

Process 400 may include additional implementations, such as any single implementation or any combination of implementations described below and/or in connection with one or more other processes described elsewhere herein.

In a first implementation, the trust designation platform may determine that the trust designation of the user changed. Additionally, the trust designation platform may provide, to a server associated with the merchant application, a message with a new trust token that identifies a new trust designation of the user, to allow at least one of the one or more interfaces of the merchant application to display the new trust designation.

In a second implementation, alone or in combination with the first implementation, when determining the trust designation, the trust designation platform may identify one or more historical trust tokens that specify one or more historical trust designations of the user. Additionally, the trust designation platform may identify, as input to the data model, the user data and the one or more historical trust tokens associated with the user to cause the data model to output a trust token that maps to at least one of: the designation as the trusted or untrusted user, or the designated trust level of the user.

In a third implementation, alone or in combination with one or more of the first and second implementations, the user data may include the user identification data. Additionally, the user identification data may include at least one of: user image data that depicts the user, or user audio data that identifies a voice of the user. In some implementations, when determining the trust designation, the trust designation platform may provide the user data as input to the data model to cause the data model to output a trust token that is based on the user identification data satisfying a threshold level of similarity with corresponding configured user data. In this case, the trust token may map to at least one of: the designation as the trusted or untrusted user, or the designated trust level of the user.

In a fourth implementation, alone or in combination with one or more of the first through third implementations, the request may include particular location data that identifies a particular geographic location of a user device used to submit the request. In some implementations, the user data may include the location data that identifies the geographic location of the mobile device that is linked to the account of the user. In some implementations, when determining the trust designation, the trust designation platform may provide, as input to the data model, the particular location data and the location data to cause the data model to output a trust token that is based on a distance between the particular geographic location of the user device and the geographic location of the mobile device satisfying a threshold distance. The trust token may map to at least one of: the designation as the trusted or untrusted user, or the designated trust level of the user.

In a fifth implementation, alone or in combination with one or more of the first through fourth implementations, the user data may include the transaction data that identifies the one or more transactions made via the account of the user. In some implementations, when determining the trust designation, the trust designation platform may provide the user data as input to the data model to cause the data model to output a trust token that is based on a likelihood that the one or more transactions were made by the user. The trust token may map to at least one of: the designation as the trusted or untrusted user, or the designated trust level of the user.

In a sixth implementation, alone or in combination with one or more of the first through fifth implementations, the user data may include the credit data that identifies the credit information of the user. In some implementations, when determining the trust designation, the trust designation platform may provide the user data as input to the data model to cause the data model to output a trust token that is based on the credit information of the user. The trust token may map to at least one of: the designation as the trusted or untrusted user, or the designated trust level of the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
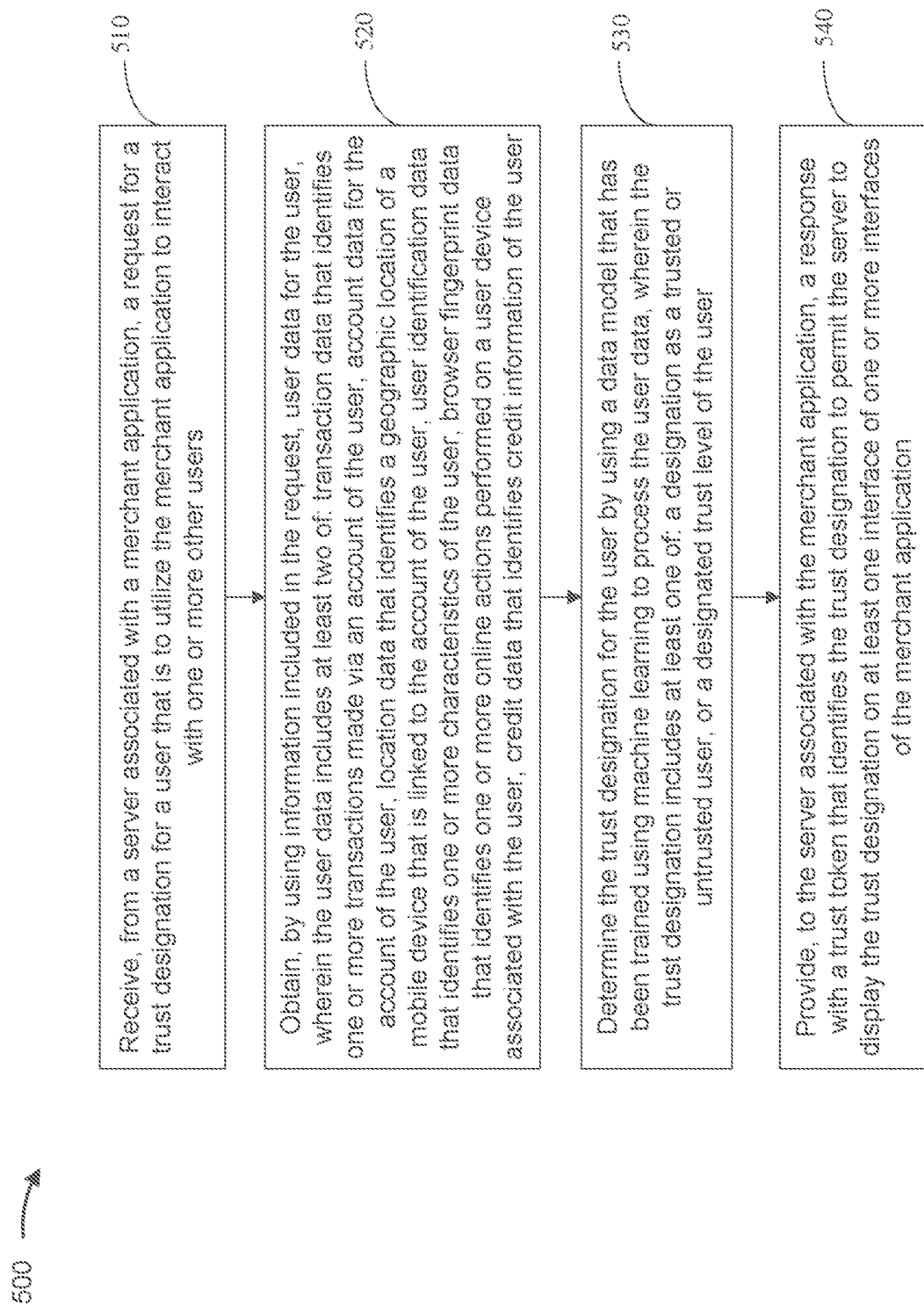

FIG. 5 is a flow chart of an example process 500 for determining a trust designation for a user and permitting the trust designation to be displayed via one or more interfaces of a merchant application. In some implementations, one or more process blocks of FIG. 5 may be performed by a trust designation platform (e.g., trust designation platform 230). In some implementations, one or more process blocks of FIG. 5 may be performed by another device or a group of devices separate from or including the trust designation platform, such as a user device (e.g., user device 210), a merchant server device (e.g., merchant server device 220), a data storage device (e.g., data storage device 250), and/or the like.

As shown in FIG. 5, process 500 may include receiving, from a server associated with a merchant application, a request for a trust designation for a user that is to utilize the merchant application to interact with one or more other users (block 510). For example, the trust designation platform (e.g., using computing resource 235, processor 320, memory 330, storage component 340, input component 350, communication interface 370, and/or the like) may receive, from a server associated with a merchant application, a request for a trust designation for a user that is to utilize the merchant application to interact with one or more other users, as described above.

As further shown in FIG. 5, process 500 may include obtaining, by using information included in the request, user data for the user, wherein the user data includes at least two of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user (block 520). For example, the trust designation platform (e.g., using computing resource 235, processor 320, memory 330, storage component 340, input component 350, output component 360, communication interface 370, and/or the like) may obtain, by using information included in the request, user data for the user, as described above. In some implementations, the user data may include at least two of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user.

As further shown in FIG. 5, process 500 may include determining the trust designation for the user by using a data model that has been trained using machine learning to process the user data, wherein the trust designation includes at least one of: a designation as a trusted or untrusted user, or a designated trust level of the user; and (block 530). For example, the trust designation platform (e.g., using computing resource 235, processor 320, memory 330, storage component 340, and/or the like) may determine the trust designation for the user by using a data model that has been trained using machine learning to process the user data, as described above. In some implementations, the trust designation may include at least one of: a designation as a trusted or untrusted user, or a designated trust level of the user.

As further shown in FIG. 5, process 500 may include providing, to the server associated with the merchant application, a response with a trust token that identifies the trust designation to permit the server to display the trust designation on at least one interface of one or more interfaces of the merchant application (block 540). For example, the trust designation platform (e.g., using computing resource 235, processor 320, memory 330, storage component 340, output component 360, communication interface 370, and/or the like) may provide, to the server associated with the merchant application, a response with a trust token that identifies the trust designation to permit the server to display the trust designation on at least one interface of one or more interfaces of the merchant application, as described above.

Process 500 may include additional implementations, such as any single implementation or any combination of implementations described below and/or in connection with one or more other processes described elsewhere herein.

In a first implementation, characteristics of the trust designation may permit the server to display the trust designation in a manner that allows the user to remain anonymous or partially anonymous.

In a second implementation, alone or in combination with the first implementation, the trust designation platform may determine, by periodically using the data model to process new user data, that the trust designation of the user has changed. Additionally, the trust designation platform may provide, to the server associated with the merchant application, a message with a new trust token that identifies a new trust designation of the user. Receipt of the message may cause the server to display the new trust designation on at least one of the one or more interfaces of the merchant application.

In a third implementation, alone or in combination with one or more of the first and second implementations, the data model may be a neural network. In some implementations, the trust designation platform may provide the user data as input to a first layer of the neural network to cause the first layer of the neural network to output an authentication score that represents a likelihood of the user being an authorized user of the account. Additionally, the trust designation platform may provide the user data and the authentication score as input to a second layer of the neural network to cause the second layer of the neural network to output a trust token that maps to at least one of: the designation as the trusted or untrusted user, or, the designated trust level of the user.

In a fourth implementation, alone or in combination with one or more of the first through third implementations, the user data may include the browser fingerprint data associated with the browser usage of the user. In some implementations, when determining the trust designation, the trust designation platform may provide, as input to the data model, the browser fingerprint data to cause the data model to output a trust token that is based on a likelihood of the browser usage being performed by the user. The trust token may map to at least one of: the designation as the trusted or untrusted user, or the designated trust level of the user.

In a fifth implementation, alone or in combination with one or more of the first through fourth implementations, the user data may include the account data for the account of the user. In some implementations, when determining the trust designation, the trust designation platform may provide the user data as input to the data model to cause the data model to output a trust token that is based on a likelihood that the change to the account was made by the user. The trust token may map to at least one of: the designation as the trusted or untrusted user, or the designated trust level of the user.

In a sixth implementation, alone or in combination with one or more of the first through fifth implementations, the user data may include at least three or more of: the location data that identifies the geographic location of the mobile device that is linked to the account of the user, the transaction data that identifies the one or more transactions made via the account of the user, the account data for the account of the user, the user identification data that identifies the one or more characteristics of the user, the browser fingerprint data associated with the browser usage of the user, or the credit data that identifies the credit information of the user.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining a trust designation for a user and permitting the trust designation to be displayed via one or more interfaces of a merchant application. In some implementations, one or more process blocks of FIG. 6 may be performed by a trust designation platform (e.g., trust designation platform 230). In some implementations, one or more process blocks of FIG. 6 may be performed by another device or a group of devices separate from or including the trust designation platform, such as a user device (e.g., user device 210), a merchant server device (e.g., merchant server device 220), a data storage device (e.g., data storage device 250), and/or the like.

As shown in FIG. 6, process 600 may include receiving, from a server associated with a merchant application, a request for a trust designation for a user that is to utilize the merchant application to interact with one or more other users (block 610). For example, the trust designation platform (e.g., using computing resource 235, processor 320, memory 330, storage component 340, input component 350, communication interface 370, and/or the like) may receive, from a server associated with a merchant application, a request for a trust designation for a user that is to utilize the merchant application to interact with one or more other users, as described above.

As further shown in FIG. 6, process 600 may include obtaining, by using information included in the request, user data for the user wherein the user data includes at least three of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user (block 620). For example, the trust designation platform (e.g., using computing resource 235, processor 320, memory 330, storage component 340, input component 350, output component 360, communication interface 370, and/or the like) may obtain, by using information included in the request, user data for the user, as described above. In some implementations, the user data may include at least three of: transaction data that identifies one or more transactions made via an account of the user, account data for the account of the user, location data that identifies a geographic location of a mobile device that is linked to the account of the user, user identification data that identifies one or more characteristics of the user, browser fingerprint data associated with browser usage of the user, or credit data that identifies credit information of the user.

As further shown in FIG. 6, process 600 may include determining the trust designation for the user by using a set of trust determination techniques to process the user data, wherein the trust designation includes at least one of: a designation as a trusted or untrusted user, or a designated trust level of the user; and (block 630). For example, the trust designation platform (e.g., using computing resource 235, processor 320, memory 330, storage component 340, and/or the like) may determine the trust designation for the user by using a set of trust determination techniques to process the user data, as described above. In some implementations, the trust designation may include at least one of: a designation as a trusted or untrusted user, or a designated trust level of the user.

As further shown in FIG. 6, process 600 may include providing, to a server associated with the merchant application, a response with a trust token that identifies the trust designation to cause the server to display the trust designation on at least one interface of one or more interfaces of the merchant application, wherein the user remains anonymous or partially anonymous while the trust designation is displayed (block 640). For example, the trust designation platform (e.g., using computing resource 235, processor 320, memory 330, storage component 340, output component 360, communication interface 370, and/or the like) may provide, to a server associated with the merchant application, a response with a trust token that identifies the trust designation to cause the server to display the trust designation on at least one interface of one or more interfaces of the merchant application, as described above. In some implementations, the user may remain anonymous or partially anonymous while the trust designation is displayed.

Process 600 may include additional implementations, such as any single implementation or any combination of implementations described below and/or in connection with one or more other processes described elsewhere herein.

In a first implementation, the trust designation platform may determine that the trust designation of the user changed. Additionally, the trust designation platform may provide, to the server associated with the merchant application, a message with a new trust token that identifies a new trust designation of the user. Receipt of the message may cause the server to display the new trust designation on at least one of: the one or more interfaces of the merchant application.

In a second implementation, alone or in combination with the first implementation, the trust designation platform may, when determining the trust designation, identify one or more historical trust tokens that specify one or more historical trust designations of the user, and may determine the trust designation by using the set of trust determination techniques to process the user data and the one or more historical trust tokens associated with the user.

In a third implementation, alone or in combination with one or more of the first and second implementations, the user data may include the transaction data and the account data. In some implementations, when determining the trust designation, the trust designation platform may determine a first trust token by using a first trust determination technique, of the set of trust determination techniques, to process the transaction data. Additionally, the trust designation platform may determine a second trust token by using a second trust determination technique, of the set of trust determination techniques, to process the account data. Additionally, the trust designation platform may determine the trust designation based on the first trust token and the second trust token.

In a fourth implementation, alone or in combination with one or more of the first through third implementations, the user data may include the credit data that identifies the credit information of the user. In some implementations, when determining the trust designation, the trust designation platform may determine a trust token by using a trust determination technique, of the set of trust determination techniques, to process the user data that includes the credit data, and may determine the trust designation based on the trust token.

In a fifth implementation, alone or in combination with one or more of the first through fourth implementations, the request may include particular location data that identifies a particular geographic location associated with an address of the user. Additionally, the user data may include the location data that identifies the geographic location of the mobile device that is linked to the account of the user. In some implementations, when determining the trust designation, the trust designation platform may compare the particular location data and the location data using a trust determination technique of the set of trust determination techniques, may determine whether the particular geographic location and the geographic location satisfy a threshold distance, may determine the trust token based on whether the particular geographic location and the geographic location satisfy the threshold distance, and may determine the trust designation based on the trust token.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a request for a trust designation for a user that is to utilize a merchant application to interact with one or more other users,
   wherein the merchant application includes one or more interfaces that allow the user to interact with the one or more other users while remaining anonymous or partially anonymous;
   obtaining, by the device and by using information included in the request, user data for the user;
   determining, by the device, the trust designation for the user by using a data model that has been trained using machine learning to process the user data,
   wherein the trust designation includes at least one of:
   a designation as a trusted or untrusted user, or
   a designated trust level of the user, and
   wherein the data model is a neural network,
   wherein the neural network is trained using a feedforward technique to provide particular user data values as input to the neural network, and
   wherein the neural network outputs a trust token that corresponds to at least one of:
   the designation as the trusted or untrusted user, or
   the designated trust level of the user; and
   permitting, by the device, at least one of the one or more interfaces of the merchant application to display the trust designation,
   wherein the user remains anonymous or partially anonymous while the trust designation is displayed.

2. The method of claim 1, wherein the data model is trained using a set of features including one or more of:
   historical transaction data that identifies one or more transactions made via an account of the user,
   historical account data for the account of the user,
   historical location data that identifies a geographic location of a mobile device that is associated with the account of the user,
   historical user identification data that identifies one or more characteristics of the user,
   historical browser fingerprint data associated with browser usage of the user, or
   historical credit data that identifies credit information of the user.

3. The method of claim 1, wherein the user data includes browser fingerprint data associated with browser usage of the user, and
   wherein determining the trust designation for the user comprises:
   providing, as input to the data model, the browser fingerprint data to cause the data model to output the trust token that is based on a likelihood of the browser usage being performed by the user.

4. The method of claim 1, wherein the user data includes account data for an account of the user; and
   wherein the trust token is based on a likelihood that a change to the account was made by the user.

5. The method of claim 1, wherein determining the trust designation for the user comprises:
   determining the trust designation for the user by using a set of trust determination techniques to process the user data.

6. The method of claim 5, wherein the user data includes credit data that identifies credit information of the user; and
   wherein determining the trust designation comprises:
   determining the trust token by using a trust determination technique, of the set of trust determination techniques, to process the user data that includes the credit data, and
   determining the trust designation based on the trust token.

7. The method of claim 5, wherein determining the trust designation for the user comprises:
   identifying one or more historical trust tokens that specify one or more historical trust designations of the user, and
   determining the trust designation by using the set of trust determination techniques to process the user data and the one or more historical trust tokens.

8. A device, comprising:
   one or more memories; and
   one or more processors communicatively coupled to the one or more memories, configured to:
   receive, from a server associated with a merchant application, a request for a trust designation for a user that is to utilize the merchant application to interact with one or more other users;
   obtain, by using information included in the request, user data for the user;
   determine the trust designation for the user by using a data model that has been trained using machine learning to process the user data,
   wherein the trust designation includes at least one of:
   a designation as a trusted or untrusted user, or
   a designated trust level of the user, and
   wherein the data model is a neural network,
   wherein the neural network is trained using a feedforward technique to provide particular user data values as input to the neural network, and
   wherein the neural network outputs a trust token that corresponds to at least one of:
   the designation as the trusted or untrusted user, or
   the designated trust level of the user; and
   provide, to the server associated with the merchant application, a response with the trust token that identifies the trust designation to permit the server to display the trust designation on at least one interface of one or more interfaces of the merchant application.

9. The device of claim 8, wherein characteristics of the trust designation permit the server to display the trust designation in a manner that allows the user to remain anonymous or partially anonymous.

10. The device of claim 8, wherein the user data includes browser fingerprint data associated with browser usage of the user, and
    wherein the one or more processors, when determining the trust designation for the user, are configured to:
    provide, as input to the data model, the browser fingerprint data to cause the data model to output the trust token based on a likelihood of the browser usage being performed by the user.

11. The device of claim 8, wherein the user data includes account data for an account of the user; and
    wherein the trust token is based on a likelihood that a change to the account was made by the user.

12. The device of claim 8, wherein the one or more processors, when determining the trust designation for the user, are configured to:

determine the trust designation for the user by using a set of trust determination techniques to process the user data.

13. The device of claim 12, wherein the user data includes credit data that identifies credit information of the user; and
wherein the one or more processors, when determining the trust designation, are configured to:
determine the trust token by using a trust determination technique, of the set of trust determination techniques, to process the user data that includes the credit data, and
determine the trust designation based on the trust token.

14. The device of claim 8, wherein the user data includes at least three or more of:
location data that identifies a geographic location of a mobile device that is linked to an account of the user,
transaction data that identifies one or more transactions made via the account of the user,
account data for the account of the user,
user identification data that identifies one or more characteristics of the user,
browser fingerprint data associated with browser usage of the user, or
credit data that identifies credit information of the user.

15. A non-transitory computer-readable medium storing instructions, the instructions comprising:
one or more instructions that, when executed by one or more processors, cause the one or more processors to:
receive, from a server associated with a merchant application, a request for a trust designation for a user that is to utilize the merchant application to interact with one or more other users;
obtain, by using information included in the request, user data for the user;
determine the trust designation for the user by using a data model that has been trained using machine learning to process the user data,
wherein the trust designation includes at least one of:
a designation as a trusted or untrusted user, or
a designated trust level of the user, and
wherein the data model is a neural network,
wherein the neural network is trained using a feedforward technique to provide particular user data values as input to the neural network, and
wherein the neural network outputs a trust token that corresponds to at least one of:
the designation as the trusted or untrusted user, or
the designated trust level of the user; and
provide, to the server associated with the merchant application, a response with the trust token that identifies the trust designation to cause the server to display the trust designation on at least one interface of one or more interfaces of the merchant application,
wherein the user remains anonymous or partially anonymous while the trust designation is displayed.

16. The non-transitory computer-readable medium of claim 15, wherein the user data includes transaction data and account data; and
wherein the one or more instructions, that cause the one or more processors to determine the trust designation, cause the one or more processors to:
determine a first trust token by using a first trust determination technique, of a set of trust determination techniques, to process the transaction data,
determine a second trust token by using a second trust determination technique, of the set of trust determination techniques, to process the account data, and
determine the trust designation based on the first trust token and the second trust token.

17. The non-transitory computer-readable medium of claim 15, wherein the user data includes credit data that identifies credit information of the user; and
wherein the one or more instructions, that cause the one or more processors to determine the trust designation, cause the one or more processors to:
determine the trust token by using a trust determination technique, of a set of trust determination techniques, to process the user data that includes the credit data, and
determine the trust designation based on the trust token.

18. The non-transitory computer-readable medium of claim 15, wherein the user data includes account data for an account of the user; and
wherein the trust token is based on a likelihood that a change to the account was made by the user.

19. The non-transitory computer-readable medium of claim 15, wherein the one or more instructions, that cause the one or more processors to determine the trust designation for the user, cause the one or more processors to:
determine the trust designation for the user by using a set of trust determination techniques to process the user data.

20. The non-transitory computer-readable medium of claim 15, wherein the one or more instructions, that cause the one or more processors to determine the trust designation for the user, cause the one or more processors to:
identify one or more historical trust tokens that specify one or more historical trust designations of the user, and
determine the trust designation by using a set of trust determination techniques to process the user data and the one or more historical trust tokens.

* * * * *

UNITED STATES PATENT AND TRADEMARK OFFICE
CERTIFICATE OF CORRECTION

Page 1 of 1

PATENT NO. : 11,049,103 B2
APPLICATION NO. : 15/929479
DATED : June 29, 2021
INVENTOR(S) : Mark Sorbello It is certified that error appears in the above-identified patent and that said Letters Patent is hereby corrected as shown below:

In the Claims

In Claim 3, Column 25, Line 52, "trust token that is based on" should be changed to --trust token based on--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*